T. G. HITT.
BURROWING PEST DESTROYER.
APPLICATION FILED FEB. 20, 1909.
951,119.
Patented Mar. 8, 1910.
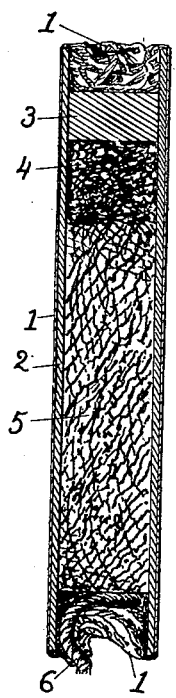

UNITED STATES PATENT OFFICE.

THOMAS GABRIEL HITT, OF SEATTLE, WASHINGTON.

BURROWING-PEST DESTROYER.

951,119.  Specification of Letters Patent.  Patented Mar. 8, 1910.

Application filed February 20, 1909. Serial No. 479,235.

*To all whom it may concern:*

Be it known that I, THOMAS G. HITT, a citizen of the United States, residing at Seattle, in the county of King and State of Washington, have invented certain new and useful Improvements in Burrowing-Pest Destroyers, of which the following is a specification.

This invention relates to devices for destroying animal pests which burrow or dwell in the ground, and its object is to provide a cartridge which, when inserted in the burrow and ignited, will produce a deadly fume and drive it into every part of the burrow.

To this end my invention consists in the construction and combination of parts forming a burrowing pest destroyer hereinafter more fully described and particularly set forth in the claim, reference being had to the accompanying drawing which represents in longitudinal section a burrowing pest exterminator according to my invention.

A cartridge shell 2, is made of stiff paper or straw board, in cylindrical form covered with thin paper 1. This shell is permanently closed by a hard rammed plug 3, of clay, which, when it dries, adheres firmly to the shell. Over this plug the covering paper 1, is tucked in. A small charge 4, of blasting powder is first placed in the shell, then the rest of the shell is to be nearly filled with a poisonous fumigating compound 5. In contact with this, a ribbon fuse or quick-match 6, is secured by twisting and pressing in the light covering paper 1, closely upon it leaving the quick match projecting enough to be readily lighted.

I find that a half ounce of blasting powder is sufficient for the driving charge 4. For the fumigating compound 5, I use potassium nitrate, 11½ parts; sulfur, 5 parts; and charcoal 2 parts. If these ingredients be mixed together in a granular form, in the proportions stated, without milling or pounding—the charcoal being as coarse as mesh 36—and fired as described, within the cartridge shell, the result will be a rapid production of asphyxiating gas without any noise, explosion, sparking or spluttering. This is important to the success of the device. If the proportions of the ingredients or their manner of compounding be so changed as to produce little explosions it is liable, when confined under ground, to smother and extinguish the burning. If the proportions or treatment is such as to produce sparkling or spluttering the animal will be frightened before the stifling gas reaches him, and he will rapidly dig farther into the ground, closing the burrow behind him, so the explosion of the driving charge will be futile. Meal powder produces some of these ill effects and cannot be successfully used. Thus completed this cartridge is inexpensive and convenient for transportation and for use. To put it in service, the quick match is first to be lighted, then the cartridge is to be placed within the mouth of the burrow, lighted end inward; then the mouth of the burrow is to be quickly covered with earth, completely closing in the cartridge. When the match burns to the composition 5, it ignites the same and easily burns or blows out the paper covering which is there very light, and the burning composition produces a volume of smoke and poisonous gases which are fatal to all animal life. When the charge 4, of blasting powder is reached by the fire it explodes and drives the smoke and poisonous gas into every recess of that burrow, quickly killing all animals therein. If smoke issues from the ground anywhere near this burrow it should be immediately stopped by piling on dirt to keep the gases inside.

Each one of the three elements of this compound burns readily and gives off a poisonous gas in burning, and the united effect is sure death to any animal which is thus forced to inhale the gas. It may be successfully used in destroying squirrels, sage rats, pocket gophers, moles, common rats, rabbits, prairie dogs, coyotes and other wolves; also venomous snakes; in fact any animal in a burrow or cave where the gases described can be confined; and where the ground is thus thoroughly treated the pests will be exterminated. One advantage not to be overlooked is the fact that the pest thus killed is already buried, and not left exposed to taint the air, nor to endanger valuable life as it would do if killed above ground by poison. As to expense; enough of these cartridges to destroy several hundred such pests can be bought at a less price than would pay for the injury done every year by each one of the said pests.

Having thus fully described my invention, what I believe to be new and desire to secure by Letters Patent, is the following claim:

In burrowing pest destroyers, a compound comprising potassium nitrate, sulfur, and charcoal mixed loosely together in granular form in substantially the proportions stated, in combination with a cartridge shell, a driving charge and a quick match.

In testimony whereof I affix my signature in presence of two witnesses.

THOMAS GABRIEL HITT.

Witnesses:
W. W. WAGER,
M. R. MARTZ.